Aug. 7, 1951  G. R. ERICSON  2,563,645
ENGINE STARTING DEVICE
Filed Dec. 19, 1946  5 Sheets-Sheet 1

Fig. 1.

INVENTOR.
BY *George R. Ericson*
ATTORNEY

Fig. 2.

INVENTOR.
BY George R. Ericson

INVENTOR.
BY George R. Ericson

INVENTOR.
BY George R. Ericson

Fig. 2.

INVENTOR.
BY George R. Ericson

Patented Aug. 7, 1951

2,563,645

UNITED STATES PATENT OFFICE 2,563,645

ENGINE STARTING DEVICE

George R. Ericson, Kirkwood, Mo.

Application December 19, 1946, Serial No. 717,233

24 Claims. (Cl. 123—119)

This invention relates to internal combustion engines and more particularly to systems for and the method of feeding fuel to engines.

When charges are supplied to an internal combustion engine from a carburetion system several disadvantages are encountered. The mixture is usually unsuitable for quick engine starting, maximum power development must be below that desired to obtain maximum economy, and detonation occurs when the throttle valve is opened suddenly with the engine in its lower speed range. To aid quick starting, provision is usually made for heating the fuel mixture, but this reduces the volumetric efficiency of the engine. Engine operating conditions have been improved by the provision of a suction controlled valve posterior of the throttle valve for regulating the volume of mixture flow as shown in my Patent 2,209,329, issued July 30, 1940.

It is an object of this invention to eliminate the need for heating the fuel mixture and to decrease the time required for starting a cold engine, having a carburetion system of the type referred to, through the provision of an auxiliary system for feeding liquid fuel directly to the intake manifold.

Another object of the invention is to provide means for feeding fuel to internal combustion engines in which a carburetion system and an auxiliary liquid fuel system utilize the same source of liquid fuel supply.

Another object of the invention is to provide a method of feeding fuel to an internal combustion engine whereby quick starting, without heat application, is promoted.

A further object of the invention is to provide an engine with carburetor and liquid fuel injection systems that are automatically controlled to materially restrict the fuel mixture volume flow from the carburetor system and to utilize the injection system when starting the engine and to disable the injection system after the engine has started.

Another object of the invention is to improve the starting of internal combustion engines through the employment of an auxiliary liquid fuel system in addition to the usual carburetion system.

Another object of the invention is to increase the maximum power output of an internal combustion engine through the employment of a liquid fuel injection system in addition to the usual carburetion system.

Still another object of the invention is to provide a method of feeding fuel to an internal combustion engine whereby power above that developed with maximum economy and ease of starting will result.

Another object of the invention is to provide a fuel feeding system for internal combustion engines that will function to enrich the normal carburetion mixture while cranking a cold engine or when maximum power development is desired.

Another object of the invention is to provide an auxiliary liquid fuel system for internal combustion engine having a carburetion system, with control means whereby, when the throttle valve is wide open, liquid fuel will be added to the carbureted mixture to increase the maximum power development.

Another object of the invention is to control a syphonic starting liquid fuel system, for engines having a carburetion system, by means responsive to temperature and vacuum whereby the system will be rendered effective below a predetermined engine temperature but will be vented beyond a predetermined vacuum development value regardless of temperature.

Another object of the invention is to control a liquid fuel feeding system, for engines having a carburetion system, by means operating with the throttle valve whereby the liquid fuel system is made effective during engine cranking and is shut off when the engine is dead and operating in the economical power range.

A further object of the invention is to control flow through a liquid fuel injection system in conjunction with a fuel volume control of a carburetion system for engines whereby liquid fuel will flow during cranking and will be shut off when danger of stalling has passed.

These and other objects of the invention will be apparent to persons skilled in the art from a study of the following description and accompanying drawings, in which:

Figure 7 is a view similar to Figs. 1 and 2 showing a further modified form of the invention In the drawing there is shown a conventional internal combustion engine 10 having the usual intake manifold 8 and exhaust manifold 9 associated therewith.

A carburetion system is connected with the intake manifold and includes a carburetor 12 having a fuel mixing and feeding conduit 13 aligned with and suitably secured to the manifold riser 11 to form a passage through which air and fuel mixture is drawn into the manifold. The carburetor cover 14 has an air inlet horn 14' aligned with conduit 13. Liquid fuel is maintained at a constant level in the carburetor bowl 16 by float 17 controlling valve 18 associated with a suitable source of supply. A main nozzle 19 discharges into venturi 20 in the mixing conduit and fuel flow thereto from the bowl is regulated by metering rod 21, the latter being controlled in accordance with the adjustment of throttle valve 22, fixed on shaft 23, in the usual manner.

The volume of fuel mixture flow to the intake manifold from the carburetion system is controlled by an axially movable valve 27 posterior of the throttle valve and preferably associated with a liner 28 in the riser 11. The head of the valve 27 is adapted to be moved toward and away from the end of the liner that projects slightly into the manifold and valve stem 29 is slidable in guide 30 formed as a part of and extending axially in the liner. Provision is made to allow a minimum fuel mixture flow into the manifold and this may be accomplished by limiting upward movement of the valve so that it is never entirely seated against the liner.

When the engine is idling, vacuum is not sufficient to draw the necessary fuel from main nozzle 19 and fuel is drawn from the low speed nozzle 32 into the mixing conduit adjacent the throttle valve. This manner of supplying fuel from a low speed nozzle for starting an idling is conventional.

Figure 5:
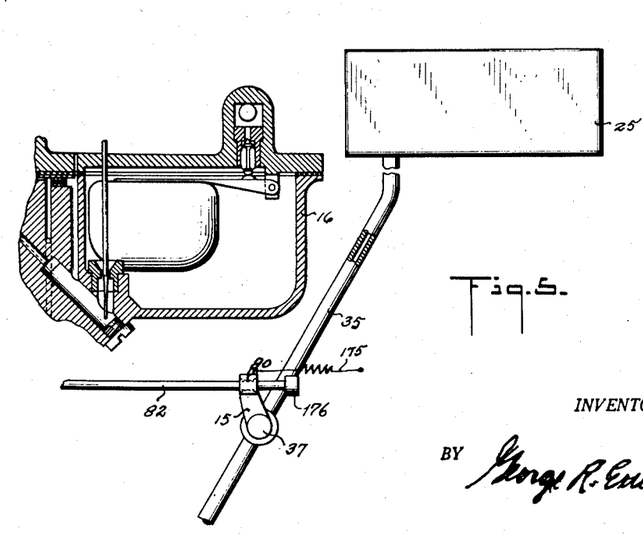
Figure 5 is a fragmentary view similar to Figs. 3 and 4 showing a further modification of the invention.

An auxilliary fuel feeding system is provided for the engine and is arranged to move liquid fuel from the carburetor bowl 16, or from a separate source of supply, directly into the intake manifold posterior of the volume control valve 27. This auxiliary system, except in Fig. 5, includes conduit means consisting of tube 33 opening into the carburetor bowl below the liquid level, passage 34 in the carburetor bowl connected with the upper end of tube 33, pipe 35 connected with passage 34 and dispensing tube 36 having an intermediate portion connected with pipe 35. Tube 36 lies in the manifold posterior of valve 27 and has an interior passage 31 extending lengthwise of the manifold with its ends restricted for spraying liquid fuel therefrom. In Figs. 5 and 7 the pipe 35 is connected with a separate source of liquid fuel supply 25 instead of the carburetor bowl, and as shown in Fig. 5 is of the gravity feed type instead of the syphon feed type.

Figure 6:
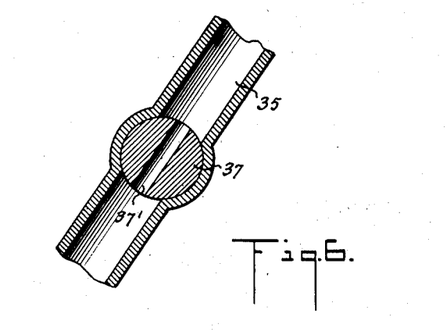
Figure 6 is an enlarged sectional view of the flow valve taken on line 6—6 of Fig. 1 shown in engine starting position.

Except in Fig. 5 flow through the auxiliary fuel feeding system is controlled by two devices, preferably in series. One control device consists of a rotatable flow valve 37 in pipe 35 having passage 37' therethrough, see Fig. 6. The other control device comprises vent valve 41 for opening or closing vent 34' from passage 34 whereby suction in the intake manifold will be effective or ineffective for syphoning liquid through the auxiliary system. Valve 37 has an arm 15 fixed thereto and in Fig. 1 this arm is shifted by link 39 connected to arm 40 on the throttle valve shaft 23. In Figs. 2, 3, 4, 5 and 7 the valve arm 15 is controlled by a lost motion rod 82 connected to throttle valve arm 40. Actuator linkage 180 is connected to arm 181 on the throttle valve shaft, see Fig. 1, and extends to the usual accelerator pedal (not shown). Except in the form of the invention shown in Fig. 7, valve 41 is actuated by mechanism in the form of a rock lever 42 to which it is pivotally connected and the lever is pivoted at 43 to the carburetor bowl cover and to a link 46 connected with piston 45.

In order to utilize engine temperature for controlling the vent valve control mechanism shown in Figs. 1, 2, 3 and 4, rod 49 is pivoted at one end to lever 42, between pivot 43 and link 46, and is fixed at the other end to the free end of a coiled spring thermostat 50. The thermostat 50 has its other end fixed at 51 to the engine exhaust manifold 9. The thermostat is expanded when cold and will act to close the air vent valve but it may be overruled by suction. In order to utilize vacuum in the carburetor venturi as the overruling agent, cylinder 47 is connected with venturi 20 by conduit 48. The pressure of spring 49' in cylinder 47 acts against piston 45 normally urging the lever 42 in a direction to close valve 41, but this spring force and the thermostat will be overruled by a predetermined venturi vacuum value, preferably a value developed when the engine is operating at a high speed such as developed by racing the engine while starting.

When the engine temperature is below a predetermined value, thermostat 50 will be unwound so that the outer end will press the rod 49 upwardly causing lever 42 to seat valve 41 and thereby close the vent 34'. The arrangement is preferably such that the thermostat will hold the valve 41 shut below the predetermined exhaust manifold temperature but the thermostat in its vent closing position may be overruled by the vacuum force developed in the venturi acting on piston 45 to open the vent under the condition previously mentioned. When the exhaust manifold temperature is above the predetermined value, the thermostat will contract and the free end will move down thereby opening the vent.

When the valve 41 is closed and valve 37 is open and the engine is turning over, liquid fuel in the auxiliary system will be drawn into the intake manifold, but when valve 41 is open or valve 37 is closed liquid fuel flow ceases. Opening valve 41 serves to break the syphon as well as the suction applied to passage 34. The ends of injector tube 36 should extend as close as possible to the cylinder inlets so that the best results will be obtained.

The control of valve 27 is generally similar to that shown in my Patent 2,209,329, issued July 30, 1940, and the previously described auxiliary fuel feeding system is particularly useful with carburetion systems for internal combustion engines having a volume and vaporizing valve 27 controlled in the manner shown in the patent.

Valve 27 is actuated directly in response to vacuum in the intake manifold. Control mechanism for the valve 27 consists of piston 55 having a rod 56 connected with link 57 by link 58. Such link 57 and another link 57' are fixed on shaft 60 and the latter arm is connected with valve rod 29 by link 59. The piston 55 is axially movable in cylinder 61 and is urged toward valve closing position by spring 62. Piston 55 is responsive to vacuum through means of a conduit 72 establishing communication between the intake manifold 8 and the interior of cylinder 61. Screw valve 73 in conduct 72 regulates suction effect on piston 55.

Follower 63, in cylinder 61, is engaged by spring 62 and has a rod 64 connected to lever 65 pivoted at 66 on the cylinder. This lever has rod 67 pivoted thereto and the rod is under control of a coiled spring thermostat 68 having one end fixed to the exhaust manifold 9 at 69. The free end of the thermostat is slotted to straddle rod 67 and is adapted to engage flange 70 on the rod. When the manifold temperature is below a predetermined value, the thermostat 68 is expanded and compresses spring 62 thereby modifying the movement of piston 55 tending to hold valve 27 closed until greater suction is developed. Above the predetermined temperature, the thermostat contracts and its outer end no longer reacts on rod 67. Spring 62 will then cause the rod flange 70 to follow the outer end of the thermostat.

The engine may be cranked by electrically operated means as disclosed in my Patent 2,147,019, issued February 14, 1939, controlled by a circuit including a dash switch (not shown) and a switch 80. The wiring circuit is connected to switch terminals 81 and 82 to which flexible contacts 83 and 84 are connected. Contact 83 is engaged by plunger 85 pivotally connected to arm 86 fixed on rock shaft 60. Spring 62 acts to rock shaft 60 to close valve 27 and to engage contact 84 with contact 83, which engagement is broken when suction overcomes the force of spring 62 to actuate piston 55 sufficiently to rock shaft 60 clockwise and move plunger 85 to a position releasing contact 83 from contact 84. Opening of valve 27 releases this contact and breaks the starter circuit.

Figure 1:
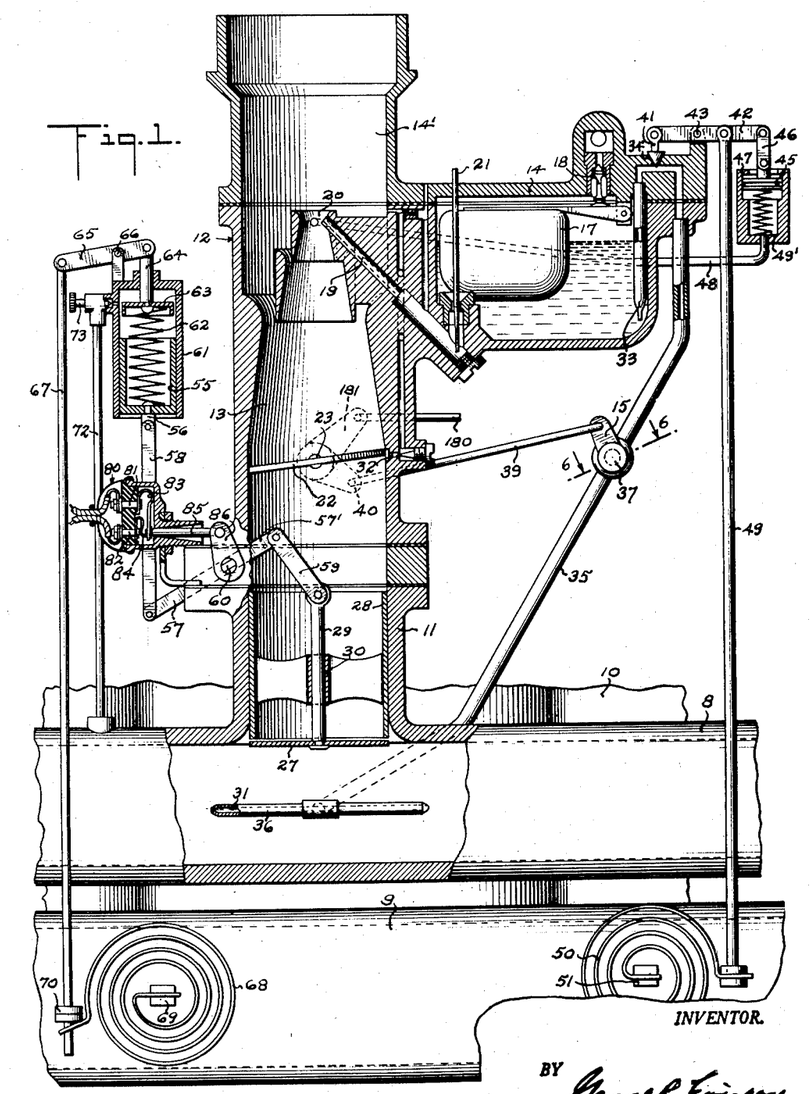
Figure 1 is a fragmentary side elevation of an internal combustion engine having associated therewith fuel feeding means incorporating the invention shown mainly in section and in elevation.

Prior to starting the engine with the controls shown in Fig. 1, the throttle valve will be substantially closed, its idling position, and valve device 37 will be closed. Due to the interconnection between the throttle valve and valve 37, opening of the throttle valve for starting will open valve device 37, see Fig. 6. While the engine is being cranked, valve 27 will be nearly closed as suction in the intake manifold is insufficient to overcome spring 62, and a minimum fuel mixture from the carburetion system will flow past valve 27. Valve device 37 is open and, assuming the engine is cold, valve 41 is seated thereby closing the vent of the auxiliary system for supply of liquid fuel to the intake manifold. There will be sufficient vacuum with valve 27 substantially closed to pull sufficient liquid fuel, which mixes with the carburetor mixture, to form an extremely rich fuel charge passing to the cylinders. The liquid fuel flow from the auxiliary system is discontinued when idling as valve device 37 is closed when the throttle valve is in idling position. Valve 41 is opened by engine temperature winding up thermostat 50, or when the vacuum condition in the carburetor venturi is sufficient to overcome the thermostat 50 and spring 44. So when the engine is operating under its own power vent valve 41 will open thereby cutting out the auxiliary system even though valve 37 is open.

The auxiliary fuel feeding system may be employed to enrich the fuel charge from carburetors not employing volume regulating valves such as valve 27, but the system is especially useful when a volume valve is employed.

Figure 2:
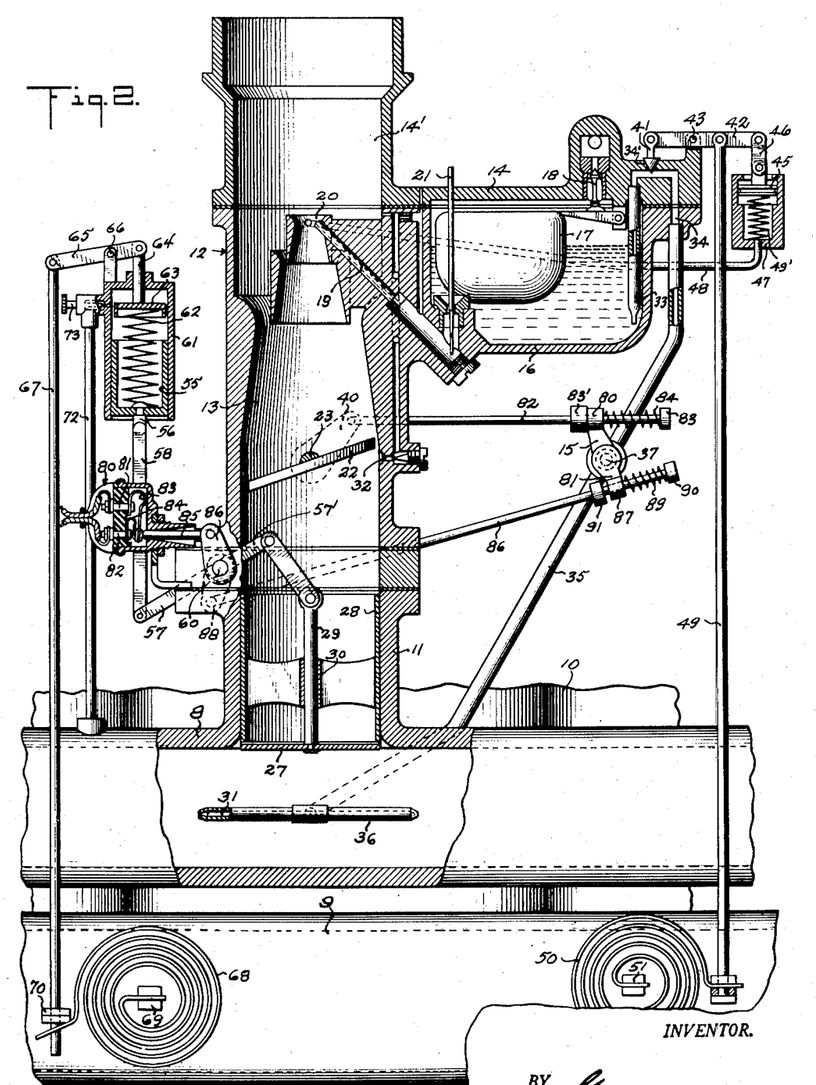
Figure 2 is a similar view showing a modified form to the invention.
Figure 3:
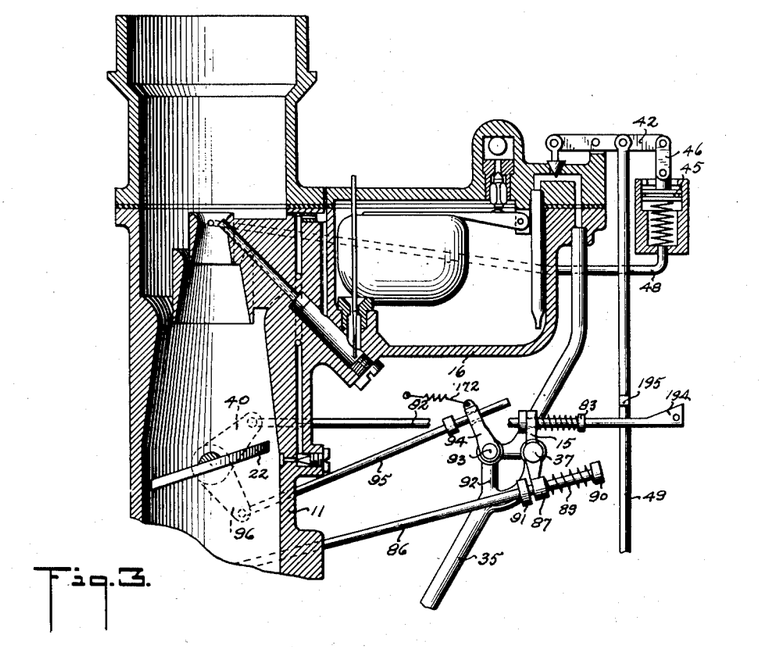
Figure 3 is a fragmentary view similar to Figs. 1 and 2 showing another modified form of control mechanism.
Figure 4:
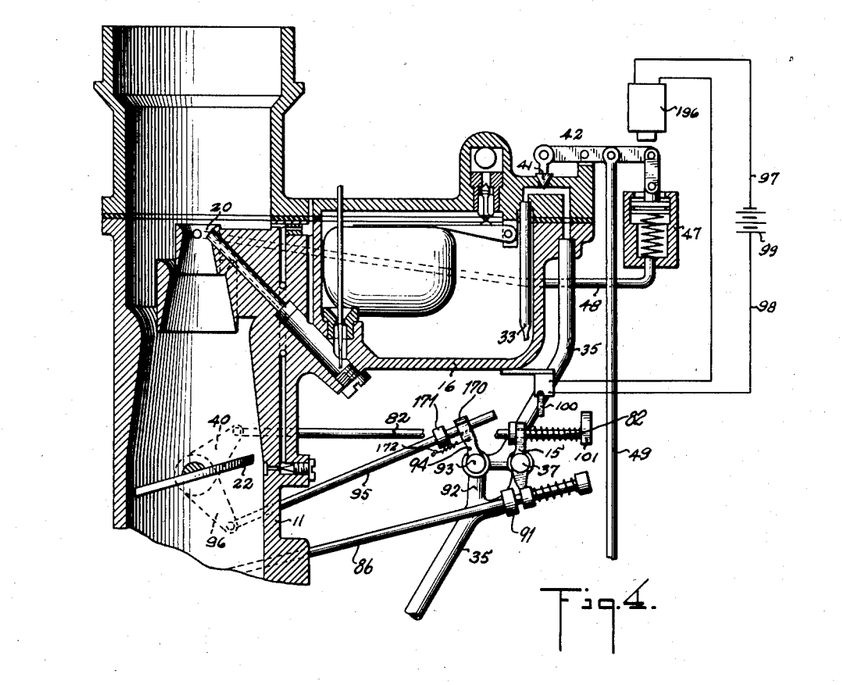
Figure 4 is a fragmentary view similar to Fig. 3 showing a further modified form of control mechanism.

In Figs. 2, 3 and 4 the structure is similar to that in Fig. 1 except that auxiliary supply valve 37 is controlled by the joint action of the throttle valve and the mechanism for operating the volume valve 27. In this form of the invention valve arm 15 is adapted to be rocked in conjunction with the throttle valve and an arm 81, an extension of arm 15, is adapted to be rocked by the mechanism for operating the volume valve. Rod 82 extends through an eye 80 on arm 15 and is pivotally connected to arm 40 on the throttle valve shaft. The other end of rod 82, as shown in Fig. 2, terminates in a head 83 and a coil spring 84 encircles the rod and seats against the rod head and the arm eye. Abutment 83' on rod 82 engages eye 80 to close the valve 37 when the throttle valve is substantially closed. The throttle valve is moved to about one third open position for starting and the rod head 83 compresses spring 84 causing eye 80 to rotate arm 15 and open the valve 37 so that the liquid fuel can flow to the manifold, assuming that the vent valve 41 is closed. Fig. 2 shows the mechanism in engine starting position. Vacuum in the manifold when cranking, is insufficient to open the volume valve beyond cracked position. Rod 86 passes through eye 87 on arm 81 and is pivotally connected to arm 88 fixed to shaft 60. Spring 89 extends around rod 86 and is seated against eye 87 and head 90 on the end of the rod. As the volume valve is opened by suction, after the engine is running, shaft 60 is rocked counter-clockwise to open the starter switch and carries arm 88 therewith pulling rod 86 to the left and thereby rocking arm 81 clockwise to close auxiliary valve 37. The vent valve will function the same as in Fig. 1. Spring 89 normally holds eye 87 against a stop collar 91 on rod 86 which position it takes when the throttle valve is closed and at which time the flow valve 37 is closed. When the throttle valve is moved to one third open position, as shown, for starting the engine the spring 84 will rock arm 15 counter-clockwise which will open the auxiliary fuel valve 37 and this will shift arm 81 counter-clockwise away from flange 91 and will compress spring 89. This compression of spring 89 will retard closing of the valve 37 relative to the opening of the volume valve 27 so that liquid fuel from the auxiliary system will be gradually cut off as the volume valve opens. Because of this synchronizing of the action of valve 37 and the volume valve 27, liquid fuel will be drawn into the manifold until danger of engine stalling has past.

In Figs. 3 and 4 provision is made for controlling the volume and auxiliary fuel valves 27 and 37 for starting as in Fig. 2 and, in addition, provision is made for utilizing the auxiliary fuel feeding system when maximum power is desired above that possible with the carburetion system. The liquid fuel system includes a conduit 92, bypassing valve 37, that has a rotatable control valve 93 arranged therein. This valve 93 has an arm 94 provided with an eye 170 through which rod 95 extends, such rod being connected to an arm 96 on the throttle valve shaft 23. The arrangement is such that when the throttle valve approaches wide open position flange 171 on the rod will engage the eye 170 and rock arm 94 against the action of spring 172 to open valve 93. As the thermostat 50 will be holding vent valve 41 open, it is necessary to provide overruling means that will close the vent valve when flow valve 93 is open. In Fig. 3 such overruling means is mechanical and consists of a cam 194 on an extension of rod 82 that engages an abutment 195 fixed on rod 49. The cam is so arranged as to contact and lift the abutment and rod 49 to positively close vent valve 41 when valve 93 is opened while the throttle valve is in wide open position.

In Fig. 4 the overruling means is electrical and consists of magnet 196 adjacent lever 42 having leads 97 and 98 connected with battery 99 and a switch 100 adapted to be closed by an abutment 101 on rod 82 when valve 93 is open to complete the circuit. These controls are effective to open valve 93 only when the throttle valve is substantially wide open so there is no interference with proper control of valve 37 for starting the engine or with operation of the carburetion system in the economy range. Thus, liquid fuel from the auxiliary system will be added to the fuel charges from the carburetion system whereby increased power is developed when desired and when starting the engine.

In Fig. 5 the auxiliary liquid fuel feeding system is utilized only for increasing the maximum power development of an engine normally utilizing a carburetion system. The auxiliary system, instead of utilizing the carburetor bowl as a source of fuel, has a separate reservoir 25 with which conduit 35 is connected. The control valve 37 is normally closed by spring 173 and is arranged to be opened by collar 176 on rod 82 when the throttle valve is in wide open position.

In the form of the invention shown in Fig. 7, the auxiliary fuel feeding system has a source of fuel supply 25 separate from the carburetor and conduit 35 leads therefrom to nozzle 36. Control valve 37 is normally closed by spring 184 and is opened by arm 15 actuated by collar 181 on rod 82 engaging eye 80 on the arm when the throttle valve is opened wide. Fuel is moved by suction and a vent control valve similar to that in Figs. 1 and 2 is utilized to control flow. In this instance vent valve 41 is fixed to piston 150 in cylinder 151 and spring 152 normally engages the piston to close the valve. The cylinder 151 is connected by conduit 153 with the mixture conduit 13 of the carburetion system posterior of the throttle valve so that strong suction will overrule spring 152 and open valve 41. The arrangement is such that valve 37 will be opened only when the throttle is wide open and valve 41 will be closed only when engine suction is weak. With these two controls, the auxiliary system will be effective only when the throttle valve is wide open and the engine is in its lower speed range. As detonation occurs frequently under this condition, the auxiliary system will be effective to increase the fuel supply and thereby lessen detonation.

What I claim is:

1. In an internal combustion engine, a fuel intake manifold, a carburetor in communication with the manifold having a liquid fuel supply bowl, valve means operating to restrict the volume of fuel mixture flowing from the carburetor to the manifold when the engine is starting and opening in response to suction in the manifold of a character developed when the engine is running, and an auxiliary system through which liquid fuel is drawn into the manifold directly from the carburetor bowl when the engine is being cranked while cold.

2. In an internal combustion engine, a fuel intake manifold, a system for feeding liquid fuel directly into the manifold when pressure in the manifold is below atmospheric pressure, a vent valve in an intermediate portion of the system, and means responsive to a predetermined pressure drop in the manifold for opening the valve.

3. In an internal combustion engine, a fuel intake manifold, a system for feeding liquid fuel into the manifold in response to a pressure condition below atmospheric in the manifold, a vent valve in the system, means for closing said valve in response to engine temperature below a predetermined value, and means responsive to a predetermined engine created pressure drop below atmospheric pressure for overruling the temperature responsive means to open the vent valve.

4. In an internal combustion engine, a fuel intake manifold, a system for feeding liquid fuel from a source of supply to the manifold in response to pressure reduction in the manifold below atmospheric pressure, a valve in the system between the source of supply and the manifold operable to open or close the system to atmosphere, mechanism for actuating said valve, and two instrumentalities for operating said mechanism, one of said instrumentalities being responsive to engine created vacuum for opening the valve, the other being a spring for closing the valve when the engine created vacuum falls below a predetermined degree.

5. The method of feeding fuel to the intake manifold of an engine comprising the introduction of a restricted volume of mixed air and liquid fuel into the manifold by suction created while cranking the engine, feeding an additional supply of liquid fuel into the manifold by suction while cranking the engine when engine temperature is below a predetermined value, discontinuing the additional liquid fuel supply when the temperature of the engine is above the predetermined value and the engine is operating under its own power and discontinuing the restriction to flow of the air and fuel mixture when vacuum is greater than that developed while cranking the engine.

6. In an internal combustion engine, a fuel intake manifold, a carburetor in communication with the manifold, a volume valve controlling flow of fuel mixture from the carburetor to the manifold, means responsive to suction in the manifold for operating said valve, an auxiliary syphon type liquid fuel supply system communicating with the manifold posterior of the volume control valve and constructed and arranged to be operated by the suction in said manifold, a vent valve in the auxiliary system and a flow control valve in the system, said vent and flow control valves being in series in the order named, and means operated by suction anterior to the throttle for opening the vent valve to break the siphon regardless of the position of the flow control valve, whereby the establishment of the siphon is dependent upon the opening of the flow control valve and the closing of the vent valve at a time when there is suction in the manifold, and whereby the auxiliary fuel supply may be discontinued either by the closing of the flow control valve or by the establishment of a predetermined suction anterior to the throttle.

7. In an internal combustion engine, a fuel intake manifold, a carburetor in communication with the manifold, a valve controlling the volume of fuel mixture flowing from the carburetor to the manifold, mechanism for shifting said valve responsive to vacuum in the manifold, an auxiliary liquid fuel feeding system communicating with the manifold posterior of the volume valve, a flow control valve in the auxiliary system, and a connection between the mechanism for operating the volume valve and the flow control valve whereby the flow control valve closes as the volume valve opens.

8. In an internal combustion engine, a fuel intake manifold, a carburetor in communication with the intake manifold, a valve controlling the volume of fuel flowing from the carburetor to the manifold, means for opening said valve in accordance with vacuum values in the manifold, an auxiliary liquid fuel feeding system connected with the manifold posterior of the volume valve, a flow control valve in the auxiliary system, means for opening the flow control valve to open it while cranking, and means operative by opening of the volume valve for closing the flow control valve as the volume valve opens.

9. In an internal combustion engine, a fuel intake manifold, a carburetor in communication with the intake manifold, a throttle valve, a valve posterior of the throttle valve controlling the volume of fuel mixture passing from the carburetor to the manifold, means urging said volume valve to substantially closed position, means responsive to vacuum in the manifold for opening said volume valve as modified by engine temperature, an auxiliary system for feeding liquid fuel to the manifold posterior of the volume valve, a flow control valve in the auxiliary system adapted to be opened by the throttle valve when starting the engine, and a connection between the volume valve actuating means and the flow valve whereby the flow valve is closed when the volume valve is opened.

10. In an internal combustion engine, an intake manifold, a carburetion system communicating with the manifold, a volume control valve in the system, means urging said valve to almost closed position, means responsive to vacuum for opening said valve when the engine is operated in the power range, an auxiliary system for feeding liquid fuel to the intake manifold posterior of the volume valve for starting the engine when cold, a flow control valve in the auxiliary system, means opening the flow valve when starting the engine, and means connecting the volume valve operating means and the flow valve to gradually close the flow valve as the volume valve opens.

11. In an internal combustion engine, an intake manifold, a carburetion system communicating with the manifold and having a throttle valve, an auxiliary system for feeding liquid fuel directly to the manifold, a flow control valve in the auxiliary system, means for closing said flow valve throughout the power range of the engine, and means operated in conjunction with the throttle valve for opening the flow valve when maximum fuel is being delivered from the carburetion system.

12. In an internal combustion engine, an intake manifold, a carburetion system for feeding fuel to the intake manifold in accordance with suction in the manifold, an auxiliary system for feeding liquid fuel to the manifold by suction, a vent valve in the auxiliary system, a flow control valve in the auxiliary system, actuating means for the vent valve responsive to engine temperature whereby the valve is closed below a predetermined temperature and opened above such temperature, means for opening the flow valve while the engine is being started and closing said valve while the engine is in its power range as developed by the carburetion system, a by-pass around the flow valve, a valve in the by-pass, means for opening the by-pass valve when the carburetion system is delivering maximum fuel, and means overruling the vent control mechanism to positively close the vent valve while the by-pass valve is open.

13. In an internal combustion engine, an intake manifold, a carburetion system connected with the manifold system and including a throttle valve, an auxiliary system for feeding liquid fuel to the manifold, a flow control valve in the system opened by the throttle valve when in engine starting position, a by-pass in the auxiliary system around the flow control valve, a valve in the by-pass, and means actuated by the throttle valve for opening said by-pass valve while the carburetion system is delivering maximum fuel.

14. In an internal combustion engine, a fuel intake chamber, a carburetion system connected with the chamber, an auxiliary liquid fuel feeding system connected with the chamber, flow control means in the auxiliary system open only for starting, a vent valve in the system, means responsive to engine temperature for opening the vent valve below a certain value and opening it above such value, a by-pass in the auxiliary system around the flow valve, a valve in the by-pass, means operating to open the valve in the by-pass when the carburetion system is fully open, and means overruling the thermostatically responsive means when the by-pass valve is open.

15. In an internal combustion engine, a fuel intake manifold, a carburetion system connected with the manifold, a throttle valve in the system, an auxiliary liquid fuel system connected with the manifold, a vent valve in the system, a flow control valve in the system posterior of the vent valve, means actuated by the throttle valve for opening the flow valve while starting the engine, mechanism for opening and closing the vent valve, a thermostat responsive to engine temperature for operating said mechanism to close the vent valve below a predetermined temperature and to open it above such temperature, a by-pass in the auxiliary system around the flow valve, a valve in the by-pass, means operated by the throttle valve for opening the by-pass valve when substantially wide open, and mechanical means operated by the throttle valve when wide open for overruling the thermostat to close the vent valve.

16. In an internal combustion engine, an intake manifold, a carburetion system connected with the manifold having a throttle valve, a power jet and a starting jet, a normally substantially closed volume control valve posterior of the throttle valve, means responsive to suction in the manifold of a value above cranking vacuum for opening said volume valve, an auxiliary liquid fuel feeding system connected with the manifold posterior of the volume valve, a flow valve in the auxiliary system, means operated by the throttle valve for opening the flow valve during starting, and actuator means operated by the volume valve operating means for closing said flow valve when the volume valve is partly open.

17. In an internal combustion engine, an intake manifold, a carburetion system connected with the manifold having a throttle valve, a volume control valve in the system posterior of the throttle valve, means responsive to suction in the manifold for regulating the volume valve opening, an auxiliary liquid fuel system connected with the manifold posterior of the volume valve, a vent valve in the auxiliary system actuated by temperature responsive mechanism to close below a predetermined engine temperature and to open above such temperature, a flow valve in the auxiliary system, means connecting the flow valve to open when the throttle valve is in starting position, means connecting the flow valve to close as the volume valve opens, a by-pass in the auxiliary system around the flow valve, a valve in the by-pass, and throttle valve operated means for opening the by-pass valve and closing the vent valve when the throttle valve is in substantially wide open position.

18. In an internal combustion engine, a fuel intake manifold, a carburetion system connected with the manifold having a throttle valve, a normally substantially closed volume control valve in the system posterior of the throttle valve, mechanism responsive to vacuum drop in the manifold below cranking vacuum for opening said volume control valve, an auxiliary liquid fuel system connected with the manifold posterior of the volume control valve, a connection between the mechanism for operating the volume valve and the flow valve for closing the flow valve as the volume valve opens, and a connection between the throttle valve and the flow valve whereby the flow valve is closed when the throttle valve is closed and opened when the throttle valve is opened for starting the engine.

19. The method of feeding fuel to the intake manifold of an engine comprising the introduction of a restricted carbureted fuel mixture into the manifold by suction created by cranking the engine, introducing liquid fuel into the manifold while cranking the engine, increasing the volume of carbureted fuel mixture as desired in the engine power range of operation and discontinuing liquid fuel introduction, and introducing liquid fuel into the manifold while the maximum volume of carbureted mixture is being introduced to increase the maximum power output of the engine.

20. In an internal combustion engine, a fuel intake manifold, a carburetion system connected with the manifold having a throttle valve, a volume control valve in the system posterior of the throttle valve, mechanism responsive to vacuum in the manifold developed above cranking speed for opening the volume valve in accordance therewith, an auxiliary liquid fuel feeding system connected with the manifold posterior of the volume valve, a flow valve in the auxiliary system normally open while cranking, a connection with the volume valve control mechanism for closing the flow valve when the volume valve is opened, a vent valve in the auxiliary system, thermostatically actuated means for closing the vent valve when the engine is cold and opening it when the engine temperature is above a predetermined value, a by-pass in the auxiliary system around the flow valve, a flow valve in the by-pass, and means actuated by the throttle valve for positively closing the vent valve and opening the by-pass valve when the throttle valve is in wide open position.

21. In an internal combustion engine, a fuel intake manifold, a carburetion system connected with the manifold having a throttle valve, a volume control valve in the system posterior of the throttle valve, mechanism responsive to vacuum in the manifold developed above cranking speed for opening the volume valve in accordance therewith, an auxiliary liquid fuel feeding system connected with the manifold posterior of the volume valve, a flow valve in the auxiliary system normally open while cranking, a connection with the volume valve control mechanism for closing the flow valve when the volume valve is opened, a vent valve in the auxiliary system, thermostatically actuated means for closing the vent valve when the engine is cold and opening it when the engine temperature is above a predetermined value, a by-pass in the auxiliary system around the flow valve, a flow valve in the by-pass, and means actuated by the throttle valve for opening the valve in the by-pass and causing the vent valve operating means to close the vent valve when the throttle valve is moved to wide open position.

22. In an internal combustion engine, a fuel intake manifold, a carburetion system connected with the manifold having a throttle valve, a normally substantially closed volume control valve in the system posterior of the throttle valve, mechanism responsive to pressure drop in the manifold below cranking pressure for opening said volume valve, an auxiliary liquid fuel system connected with the manifold posterior of the volume valve, a flow control valve in the auxiliary system, connecting means between the volume valve opening mechanism and the flow valve whereby the flow valve will be closed in the engine power range, mechanism operated by the throttle valve for opening the flow valve, a by-pass around the flow valve in the auxiliary system, a flow control valve in the by-pass, and mechanism controlled by the throttle valve to close the valve in the by-pass while the throttle valve is partly open and to open said by-pass valve when the throttle valve is wide open.

23. In an internal combustion engine, a fuel intake manifold, a carburetion system connected to the manifold having a throttle valve, a normally substantially closed volume control valve in the system posterior of the throttle valve, mechanism responsive to suction in the manifold of a value greater than cranking created suction for opening said valve, means responsive to engine temperature for retarding the effect of suction on the valve opening mechanism when the engine is cold, an auxiliary liquid fuel feeding system connected with the manifold posterior of the volume valve, a flow control valve in the auxiliary system adapted to be open while cranking the engine, and means actuated by the volume valve opening mechanism for closing said flow valve as the volume valve is opened.

24. In an internal combustion engine, an intake manifold, a carburetion system connected with the manifold having a throttle valve, an auxiliary syphon fuel system open to the manifold, vent valve means for the auxiliary system, means for opening the vent valve in response to suction in the carburetion system when engine operating conditions would develop detonation, flow valve means for the auxiliary system in series with the vent valve, and means operative when the throttle valve is wide open for opening the flow valve.

GEORGE R. ERICSON.

REFERENCES CITED

The following references are of record in the file of this patent:

UNITED STATES PATENTS

| Number | Name | Date |
|---|---|---|
| 1,858,392 | Davis | May 17, 1932 |
| 2,063,087 | FitzGerald | Dec. 8, 1936 |
| 2,092,685 | Viel | Sept. 7, 1937 |
| 2,184,834 | Haast | Dec. 26, 1939 |
| 2,230,311 | Seymour | Feb. 4, 1941 |
| 2,342,519 | Pierce | Feb. 22, 1944 |

FOREIGN PATENTS

| Number | Country | Date |
|---|---|---|
| 560,338 | France | Oct. 2, 1923 |